(12) United States Patent
Gehret et al.

(10) Patent No.: US 9,833,924 B2
(45) Date of Patent: Dec. 5, 2017

(54) METHOD AND APPARATUS FOR AUTOMATICALLY ADJUSTING A MITER SAW FENCE

(75) Inventors: Robert S. Gehret, Hampstead, MD (US); Craig A. Schell, Street, MD (US); Daryl S. Meredith, York, PA (US); Torrey R. Lambert, Baltimore, MD (US); Adan Ayala, Baltimore, MD (US)

(73) Assignee: Black & Decker Inc., New Britain, CT (US)

( * ) Notice: Subject to any disclaimer, the term of this patent is extended or adjusted under 35 U.S.C. 154(b) by 1708 days.

(21) Appl. No.: 12/541,364

(22) Filed: Aug. 14, 2009

(65) Prior Publication Data
US 2010/0043614 A1    Feb. 25, 2010

Related U.S. Application Data

(60) Provisional application No. 61/136,270, filed on Aug. 22, 2008.

(51) Int. Cl.
| | |
|---|---|
| B27B 5/00 | (2006.01) |
| B23D 33/02 | (2006.01) |
| B62D 1/18 | (2006.01) |
| B27B 27/10 | (2006.01) |
| B23D 59/00 | (2006.01) |

(52) U.S. Cl.
CPC ............ B27B 27/10 (2013.01); B23D 59/005 (2013.01); *Y10T 83/7697* (2015.04); *Y10T 83/7726* (2015.04)

(58) Field of Classification Search
CPC ... B27B 27/10; B23D 59/005; Y10T 83/7697; Y10T 83/7726

USPC ..... 83/471.3, 473, 477.2, 471.1, 471.2, 397, 83/483–490, 581, 468.3, 468.4
See application file for complete search history.

(56) References Cited

U.S. PATENT DOCUMENTS

| | | | | |
|---|---|---|---|---|
| 3,302,669 | A | * | 2/1967 | Edler ........................ 83/471.3 |
| 4,452,117 | A | * | 6/1984 | Brickner et al. ............. 83/468 |
| 4,641,557 | A | * | 2/1987 | Steiner et al. .............. 83/76.7 |
| 4,798,113 | A | * | 1/1989 | Viazanko .................. 83/471.3 |

(Continued)

FOREIGN PATENT DOCUMENTS

| | | |
|---|---|---|
| EP | 0091558 A2 | 10/1983 |
| EP | 0586171 A2 | 3/1994 |
| EP | 1738850 A1 | 1/2007 |

OTHER PUBLICATIONS

Mark Rijks, European Search Report, Jun. 29, 2011, The Hague. Annex to the European Search Report on European Patent Application No. EP 09168099.

*Primary Examiner* — Ghassem Alie
*Assistant Examiner* — Bharat C Patel
(74) *Attorney, Agent, or Firm* — Adan Ayala

(57) ABSTRACT

A miter saw is provided. The miter saw includes a table for supporting a workpiece; a fence located on the table; and a beveling arm for supporting a saw blade, the fence operatively connected to the arm to move the fence when the blade is beveled so that the blade does not contact the fence when the blade is moved toward the table. A method of locating a workpiece near a saw blade is provided. The method may include moving an adjustable section of fence near a path the saw blade will travel by beveling the saw blade; and moving a workpiece to contact the fence near the saw blade path.

14 Claims, 14 Drawing Sheets

(56) References Cited

U.S. PATENT DOCUMENTS

| | | | |
|---|---|---|---|
| 5,042,348 A * | 8/1991 | Brundage et al. | 83/471.3 |
| 5,297,463 A * | 3/1994 | O'Banion et al. | 83/468.3 |
| 5,752,422 A * | 5/1998 | Inoue et al. | 83/468.3 |
| 5,775,192 A * | 7/1998 | Fuecker et al. | 83/597 |
| 5,816,129 A * | 10/1998 | Singer | 83/468.3 |
| 5,855,366 A * | 1/1999 | Chang | 269/315 |
| 6,073,529 A * | 6/2000 | Shibata et al. | 83/468.5 |
| 6,418,830 B1 * | 7/2002 | Stumpf et al. | 83/468.2 |
| 6,425,309 B1 * | 7/2002 | Stumpf et al. | 83/468.2 |
| 6,513,412 B2 * | 2/2003 | Young | 83/471.3 |
| 6,758,123 B2 * | 7/2004 | Svetlik et al. | 83/471.3 |
| 6,899,005 B1 * | 5/2005 | O'Banion et al. | 83/468.3 |
| 2002/0100350 A1 * | 8/2002 | Brazell | 83/438 |
| 2004/0079214 A1 * | 4/2004 | Meredith et al. | 83/471.3 |
| 2004/0112190 A1 * | 6/2004 | Hollis et al. | 83/13 |
| 2005/0028662 A1 * | 2/2005 | Judge | 83/581 |
| 2006/0005677 A1 * | 1/2006 | Lambert et al. | 83/471.3 |
| 2006/0086225 A1 * | 4/2006 | Xin | 83/581 |
| 2006/0266190 A1 * | 11/2006 | Saitou et al. | 83/581 |
| 2006/0288836 A1 * | 12/2006 | Wang et al. | 83/438 |
| 2007/0006704 A1 * | 1/2007 | Chiu | 83/581 |
| 2007/0214926 A1 * | 9/2007 | Ceroll et al. | 83/471 |
| 2007/0221028 A1 * | 9/2007 | Chen | 83/467.1 |
| 2008/0041211 A1 * | 2/2008 | Gibbons et al. | 83/473 |
| 2008/0047406 A1 * | 2/2008 | Hollis et al. | 83/13 |
| 2008/0053283 A1 * | 3/2008 | Lin et al. | 83/440 |

* cited by examiner

METHOD AND APPARATUS FOR AUTOMATICALLY ADJUSTING A MITER SAW FENCE

The present application derives priority from U.S. Provisional Application No. 61/136,270, filed on Aug. 22, 2008, which is hereby fully incorporated by reference.

FIELD OF THE INVENTION

The present invention relates generally to a method and apparatus for supporting or locating a workpiece being worked on by a power tool. More particularly, the present invention relates to a method and apparatus for automatically adjusting a fence as a miter saw adjusts to various bevel angles.

BACKGROUND OF THE INVENTION

Miter saws generally provide support and locate a workpiece being cut by the miter saw with a substantially horizontal table portion and a fence portion. The fence portion is usually perpendicular to the table portion. A workpiece may rest on the table and be pressed against the fence to position the workpiece for being cut by the miter saw. Compound miter saws are often adjustable in two axes, the miter axis and the bevel axis. When the miter saw is adjusted along the miter axis, the miter saw makes a cut on the workpiece generally perpendicular with respect to the generally horizontal table. When the miter saw is adjusted along the bevel axis, then the saw makes a cut on the workpiece that is generally not (but can be if desired) perpendicular with respect to the table but creates a cut at some other angle with respect to the table.

In order to help secure a workpiece being cut by the miter saw and reduce the likelihood of the workpiece from moving out of position while the workpiece is being cut, a fence of the miter saw may be designed and intended to provide positioning and/or support for the workpiece in relatively close proximity to the saw blade.

Typically when a user changes the bevel angle of the miter saw, the fence of the miter saw must also be changed to prevent contact of the fence by the saw blade. In some instances the position of the fence may be changed by sliding a portion of the fence that is slidably attached to a fence base portion away from the blade. Another approach for adjusting the position of the fence is to rotate a pivotally attached portion of the fence into an area that will assure that it does not contact the saw blade. In either instance the user must manually change the position of the fence when the miter saw bevel angle is changed in order to avoid interference between the fence and the saw blade when the saw blade is cutting a workpiece. Certain advantages may be obtained by automating this manual process.

Accordingly, it is desirable to provide a method and apparatus that will automatically adjust the position of the fence when the bevel angle of the saw is adjusted. It may be desirable to adjust the fence so that it will continue to provide support for the workpiece while the workpiece is being cut by the miter saw at a bevel angle. It may also be desirable to move the fence to a position where the fence does not come in contact with the saw blade when the saw blade is making a bevel cut on a workpiece.

SUMMARY OF THE INVENTION

The foregoing needs are met, to a great extent, by the present invention, wherein in one aspect a method and/or apparatus is provided that in some embodiments, the fence provides support for a workpiece near a saw blade and doesn't require manual adjusting after the saw blade has been beveled.

In accordance with one embodiment of the present invention, a miter saw is provided. The miter saw includes: a table for supporting a workpiece; a fence located on the table; and a beveling arm for supporting a saw blade, the fence operatively connected to the arm to move the fence when the blade is beveled so that the blade does not contact the fence when the blade is moved toward the table.

In accordance with another embodiment of the present invention, a miter saw is provided. The miter saw includes: a frame assembly; a saw blade operatively connected to the frame assembly and configured to bevel to a variety of angles with respect to the frame assembly; and a fence for locating a workpiece, the fence movably connected to the frame and configured to move along the frame assembly to a location where it will be cut by the saw blade. The fence is made of a material easily cut by the saw blade.

In accordance with yet another embodiment of the present invention, a method of locating a workpiece near a saw blade is provided. The method includes: moving an adjustable section of fence near a path the saw blade will travel by beveling the saw blade; and moving a workpiece to contact the fence near the saw blade path.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
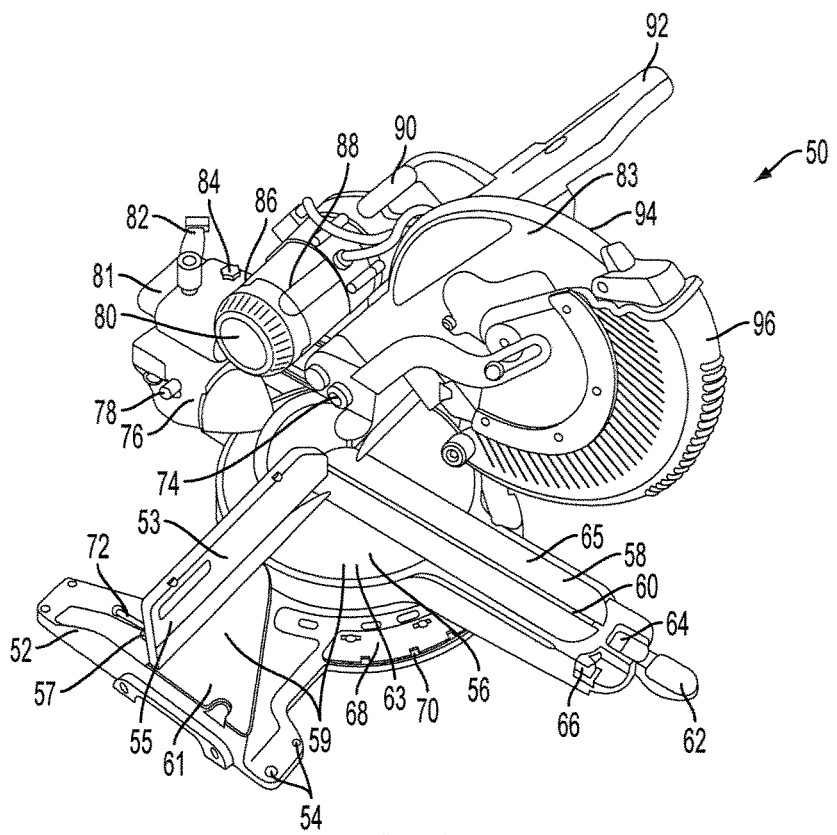
FIG. 1 is a perspective view illustrating a miter saw that may be equipped with a fence in accordance with the invention.

The invention will now be described with reference to the drawing figures, in which like reference characters refer to like parts throughout. An embodiment in accordance with the present invention provides a miter saw 50. A miter saw 50 includes a frame 52. The frame 52 has bench mounting holes 54. The bench mounting holes 54 assist in mounting the miter saw 50 to a work bench or table where bolts or screws can be extended through the bench mounting holes 54 to secure the miter saw 50 to the bench or table.

The miter saw 50 also has a fence 55 located on a table 56. The table 56 has a relatively flat portion upon which a workpiece can be set for being cut by the miter saw 50. The fence 55 defines a generally vertical surface 53 while the table 56 defines a generally horizontal surface 59. The two surfaces 53, 59 are useful for locating a workpiece for cutting.

The fence 55 has a fence clamp knob 57 which can be loosened to adjust the fence along a horizontal position. Once the fence 55 is in a desirable position the fence clamp knob 57 can be tightened to secure the fence 55 in the desired position.

The table 56 includes a kerf plate 58. The kerf plate 58 includes or defines a slot 60. The slot 60 permits the saw blade to extend below the horizontal surface 59 of the table 56 without damaging the blade. The table 56 includes a stationary part 61 of the table 56 located on the outer periphery of the table 56 and is fixed with respect to the frame 52. The table 56 also includes a rotating part 63 of the table 56 that can be rotated with respect to the frame 52 as will be described in more detail below.

A miter lock handle 62 is mounted to the miter arm 65 on the rotating part 63 of the table 56. The miter lock handle 62 and miter latch button 64 can be actuated to unlock the miter arm 65 so that the miter arm 65 can be rotated to a desired position. A miter latch override 66 is also provided on the miter arm 65. The miter latch override 66 allows the miter arm 65 to easily move past the common stop angles which may have detents 70 associated with them.

A miter scale 68 is located on the frame 52 and may be useful in selecting a position to rotate the miter arm 65. The miter scale 68, according to some embodiments of the invention, may have detents 70 which will allow the miter arm 65 to stop and "click" into place at various positions (often at common stop angles) along the miter scale 68.

As shown in FIG. 1 some embodiments of the invention include a miter saw 50 that is included with a blade wrench 72. Some embodiments of the miter saw 50 may also include a lockdown pin 74 and a bevel scale 76. The bevel scale 76 may be useful in allowing a user to determine a position to adjust the miter saw 50 when selecting a bevel angle. Bevel latch levers 78 and a bevel lock handle 82 can be articulated to allow the circular saw 83 to be beveled. In some embodiments of the invention, the circular saw 83 may be beveled 48 degrees left or right. The circular saw 83 may include two bevel latch levers 78, one on either side of the rear support housing 81.

In some embodiments of the invention, only one of the bevel latch levers 78 needs to be moved to bevel the circular saw 83 in either direction. The bevel lock handle 82 is on top of the rear support housing 81. In some embodiments of the invention, to bevel the circular saw 83 the bevel lock handle 82 is loosened and one of the bevel latch levers 78 may be lifted approximately 45 degrees and then the circular saw 83 may be beveled to the desired angle as indicated on the bevel scale 76. The bevel lock handle 82 is then locked in place to lock the saw 83 in place. The bevel latch levers 78 may be lifted vertically to override any detents at common stop angles located along the bevel scale 76. A rail lock knob 84 may also be located on the rear support housing 81 along with a rail set screw adjustment 86.

The circular saw 83 may include a motor housing 88, motor cap 80. The miter saw 50 may include a lifting handle 90 for lifting the entire miter saw 50. An operating handle 92 is provided to permit just the circular saw 83 portion of the miter saw 50 to be raised and lowered in order to make miter cuts. The actual cutting blade itself may be protected by a saw blade housing 94 and a saw blade guard 96.

Figure 2:
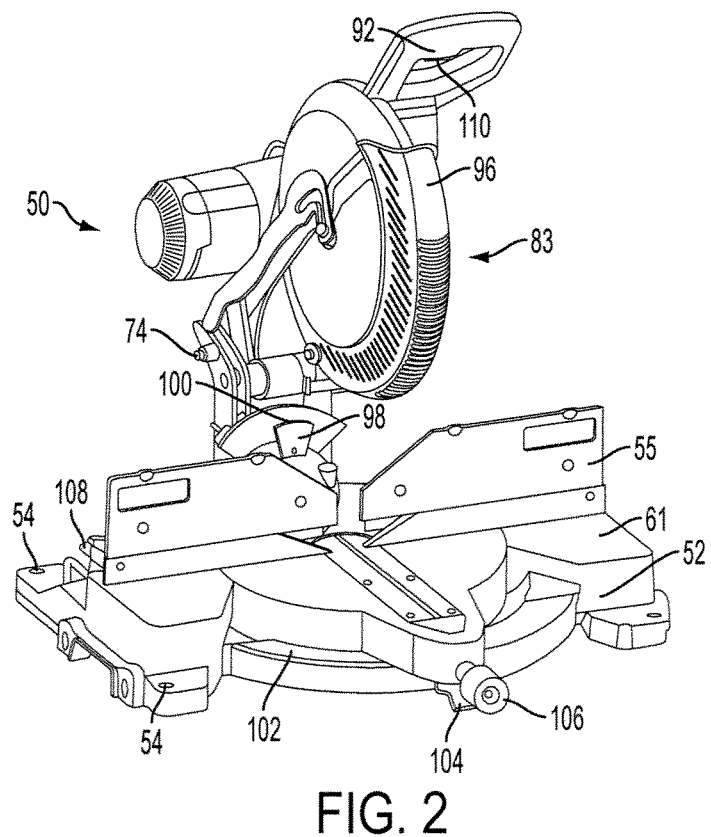
FIG. 2 is a perspective view of another type of miter saw that may be equipped with a fence in accordance with the present invention.

Other embodiments of the invention may include miter saws 50 that may have a slightly different lay out. For example, a second miter saw 50 is shown in FIG. 2. In the miter saw 50 illustrated in FIG. 2, a bevel scale 98 is located under the circular saw 83 and includes a bevel scale indicator 100. Also, the miter scale 102 is located on the frame 52 but instead of having a miter lock handle 62 as shown in FIG. 1, the miter saw 50 as shown in FIG. 2 includes a miter latch 104 and a miter clamp lock 106. It also has a fence clamp knob 108. The operating handle 92 includes a trigger switch 110 which may be common to many yes of miter saws 50, not just those shown in the FIGS.

Figure 3:
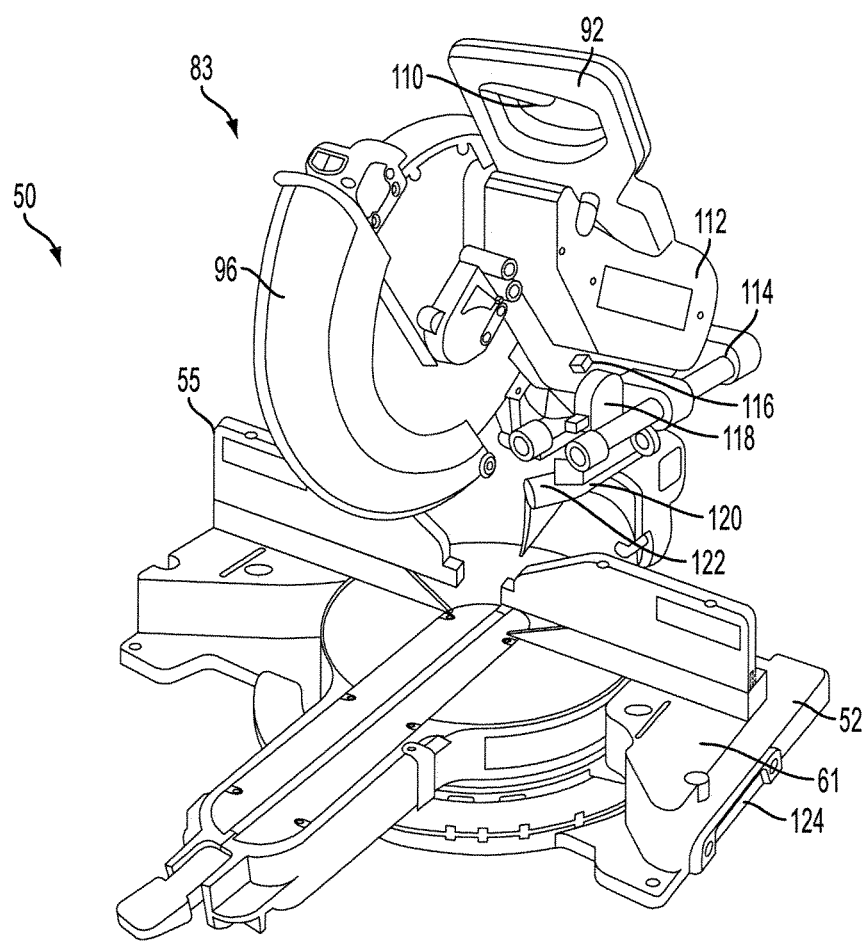
FIG. 3 is a perspective view taken from a different angle of the saw illustrated in FIG. 1.

Turning now to FIG. 3, the miter saw 50 illustrated in FIG. 1 is shown from a different angle to illustrate additional components. The operating handle 92 includes a trigger switch 110. A belt cover 112 is also illustrated. The circular saw 83 is mounted upon rails 114 and includes a thumb screw 116 to allow adjustment along the rails 114. A grooving stop 118 is provided.

As shown in FIG. 3, the miter saw 50 includes bevel latch plates 120 and a dust duct 122 where, in optional embodiments of the invention, dust can be collected in order to assist in keeping a working area clear of sawdust.

A hand indention 124 is located in the frame 52 in order to provide a hand hold to assist in moving the frame 52 to a desired position upon a table or workbench prior to being secured to the table or workbench. The hand indention 124 may also be a useful hand hold for whenever preparing to move the miter saw 50.

The following description and reference figures are directed to different types of fences that may be used for miter saws in order to assist in providing an adjustable fence that can be located very close to the saw blade. Providing a surface for a workpiece to rest against or supporting a workpiece in close proximity to the saw blade can provide several advantages. For example, providing a surface for a workpiece to rest against or support for the workpiece near the saw blade can reduce the likelihood that the workpiece may move as the saw blade cuts through the workpiece. Keeping the workpiece in place while it is being cut will allow a more precise cut to be made.

Figure 4:
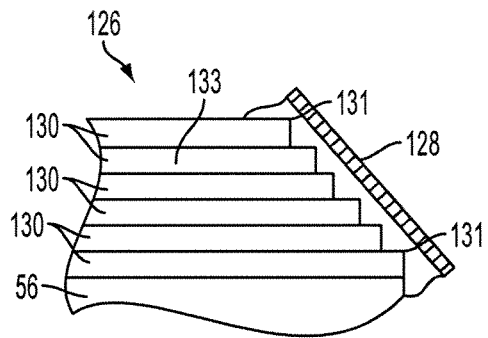
FIG. 4 is a perspective view of a fence adjusted in close proximity to a saw blade in accordance with an embodiment of the invention.

FIG. 4 illustrates a stepped fence 126. A stepped fence 126 is shown to be in close proximity to a saw blade 128. The stepped fence 126 is located on top of the table 56. The stepped fence 126 includes several pieces or steps 130. The steps 130 are located on top of each other and can slide independently of each other so they can be brought to rest against or nearly against the saw blade 128. The steps 130 form a flat surface 133 substantially vertical to the table 56. The flat surface 133 provides a surface for a workpiece to rest against.

The independently moving steps 130 may be useful when the saw blade 128 is oriented at a beveled angle. When the saw blade 128 is oriented at a bevel angle, the saw blade 128 can come very near to the adjusted stepped fence 126 at an angle. When the saw blade 128 is at some bevel angles, the lowest step 130 extends further toward the blade 128 than the upper most step 130 as shown in FIG. 4. If the saw blade 128 was at a different angle then the relative distances the steps 130 extend toward the blade 128 would change. Because the steps 130 can slide independently from each other, they can slide to whatever position needed in order to rest against, or nearly against the saw blade 128.

As shown in FIG. 4, due to the angle of the saw blade 128 with respect to the table 56, the bottom most step 130 extends the longest and top most step 130 extends the shortest distance in order to engage the blade 128. Due to the bevel angle of the blade 128 shown in FIG. 4, only the upper right hand corner 131 of the steps 130 actually engage the blade 128. One skilled in the art will appreciate after reviewing this disclosure that as the bevel angle of the saw blade 128 changes, the steps 130 may be repositioned to engage, or nearly engage, the saw blade 128.

Figure 5:
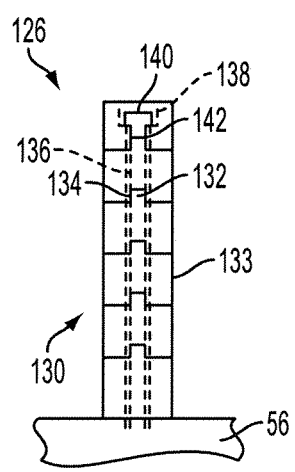
FIG. 5 is a side view of a fence made with multiple segments in accordance with an embodiment of the invention.
Figure 6:
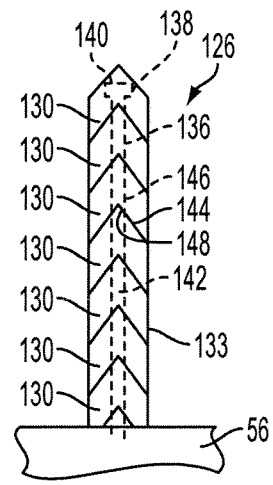
FIG. 6 is a side view of a fence made of multiple segments in accordance with another embodiment of the invention.

FIGS. 5 and 6 illustrate different embodiments of the stepped fence 126. In both FIGS. 5 and 6, the steps 130 are generally rectangular members stacked on top of each other. As shown in FIG. 5, the steps 130 have a tongue 132 which fits into the groove 134 of the step 130 located above. This tongue 132 and groove 134 configuration aids in allowing the steps 130 to slide upon each other while remaining aligned and/or parallel with each other.

In some embodiments of the invention the stepped fence 126 also includes a slot 136. The slot 136 may have a wider portion 138 located near the top of the stepped fence 126 in the upper most step 130. Located within the wide portion 138 of the slot 136 is a head portion 140 of a fastener 142. The fastener 142 may extend through the slots 132 in the various steps 130. The fastener 142 has a head 140 which is wider than the rest of the fastener 142. The wide head 140 of the fastener 142 being wider than the narrower portion of the slot 136 is what keeps the steps 130 from becoming separated.

The fastener head 140 is not tightly pressed against the top step 130 so that the steps 130 are free to slide along each other. The slots 136 are elongated and run longitudinally along the steps 130. The amount of travel that the steps 130 can move may be defined by the geometry of the slots 136. The fasteners 142 may attach directly to the table 56 or may extend through the table 56 to a fastener such as a nut located below the table 56.

FIG. 6 shows an alternate embodiment of a stepped fence 126. Rather than having a tongue 132 and groove 134 type connection between the different steps 130, the steps 130 have a chevron-like cross section so that the steps 130 fit one on the other and can slide longitudinally with respect to each other but remain substantially parallel.

Similar to that described with respect to FIG. 5, the steps 130 in accordance with the embodiment shown in FIG. 6 may be equipped with slots 136 which may be elongated in the same direction as the length of the steps 130. The limit of the travel of the steps 130 with respect to each other may be defined by the geometry of the slots 136. The slots 136 include a wide portion 138 which receive a head portion 140 of a fastener 142. The head portion 140 of the fastener 142 prevents the steps 130 from becoming separated but still allows the steps 130 to move with respect to each other while remaining parallel as shown in FIG. 4 and described with respect to FIG. 5. The fastener 142 may be attached directly to a table 56 or extend through the table 56 to another fastener such as a nut or bolt located below the table 56.

The chevron like connection 144 includes a cut out portion 146 in which a peak portion 148 of the step 130 below fits into. Both the chevron connection 144 and the tongue 132 and groove 134 connection shown and described with respect to FIGS. 5 and 6 are merely examples of different types of connections the steps 130 may have which permit them to move longitudinally with respect to each other.

Figure 7:
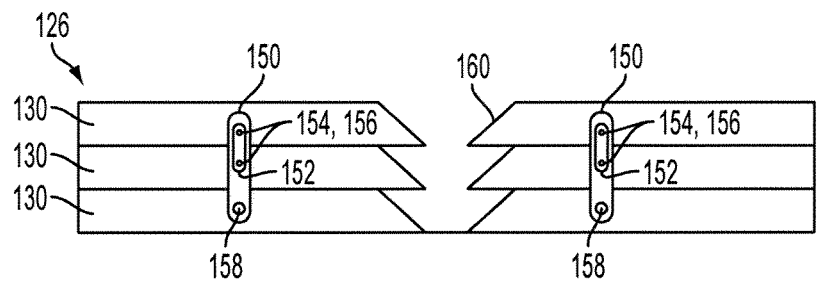
FIG. 7 is a rear view of a fence in accordance with an embodiment of the invention.

In another embodiment of the invention shown in FIG. 7, the stepped fence 126 includes several steps 130 connected by a link 150. The link 150 includes a slot 152. The slots 152 may have a larger portion which will allow the fastener head 154 to fit into the slot 152 and then a smaller portion which will not permit the fastener head 154 to fit into but will rather permit only the fastener 156 to fit into. The fastener 156 can thereby be secured to the step 130 either by being screwed into the step 130 or otherwise attached to the step 130. To retain the steps 130 together, the fastener head 154 urges against the more narrow portion of the slot 152 within the link 150 similar to the way the fastener heads 140 retain or urge against the narrow portion of the slot 136 as described above with respect to FIGS. 5 and 6. The link 150 is pinned to one of the steps 130 by a pivot pin 158.

The link 150 is configured to pivot about the pivot pin 158 and one of the steps 130 while allowing the fasteners 156 to slide through the slot 152 as the steps 130 slide on each other. The link 150, slot 152 and fastener 156 mechanism permits the steps 130 to slide with respect to each other but not separate from each other. While it is shown that the link 152 is pinned to the lower most step 130 it could be pinned to any of the steps. Also, the number of steps 130 is not limited to three but may include any amount of steps. To accommodate additional steps 130 the link 150 can be lengthened to accommodate more fasteners 156 associated with additional steps 130.

Figure 8:
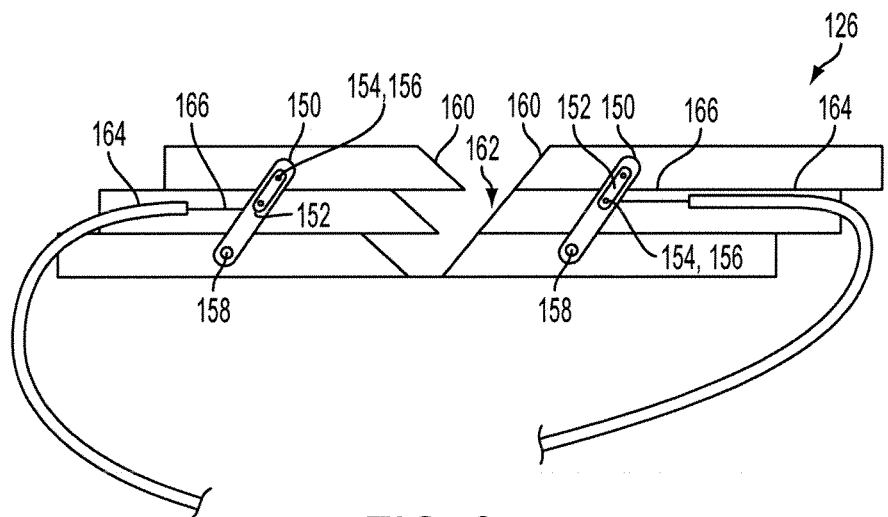
FIG. 8 is a rear view of a fence in accordance with an embodiment of the invention.

FIG. 8 illustrates a stepped fence 126 similar to that shown in FIG. 7 but it has some additional features. Also, it should be noted that in some embodiments of the invention, as shown in FIGS. 7 and 8, the steps 130 may include an angled end 160. The steps 130 may be arranged so that the angled ends 160 can form a single continuous surface 162. The angle at which the continuous surface 162 is made may be selected by one skilled in the art to achieve a desired result. In some embodiments of the invention, the angle 162 may correspond with the maximum amount of bevel angle the saw blade 128 may achieve when tilting in the direction toward the portion of the stepped fence 126.

According to some embodiments of the invention, the slot 152 within the link 150 may be dimensioned so that the fastener heads 154 are located in the extreme ends of the slot 152 when the steps 130 are in a position where the angled ends 160 form a flat surface 162 as shown in FIG. 8. Thus, in some embodiments of the invention as shown in FIGS. 7 and 8, the stepped fence 126 can achieve various positions between the extreme position shown in FIG. 8, the middle position as shown in FIG. 7, and another position where the steps 130 on the left achieve a position where the angled ends 160 form a flat surface 162 similar to that shown in FIG. 8 (the opposite extreme of that shown in the FIGS).

In the embodiments shown in FIGS. 7 and 8, the steps 130 may be moved and adjusted by the saw blade 128 itself contacting the steps 130 as the saw blade 128 is beveled.

In the embodiment shown in FIG. 8, the steps 130 may be moved by a cable 166 attached to the link 150. The cable 166 may be housed within a sheath 164 and may be a Bowden type cable or any other suitable cable for transmitting force. The cable 166 is attached to the link 150 and may move the link 150 by either pushing against the link 150 or pulling on the link 150 as the cable 166 moves into the cable sheath 164.

As shown in FIG. 8, the cable 166 is attached to the link 150 on one side of the fastener 156 so that as the cable 166 moves out or moves into the cable sheath 164 the link 150 will pivot about the fastener head 154 and pin 158. In some embodiments of the invention the cable 166 can be attached to the circular saw 83 so that as the circular saw 83 pivots to one side or the other, it will move the cable 166 which will in turn adjust the stepped fence 126 to a desired position with respect to the saw blade 128. One skilled in the art after viewing this disclosure will be able to select dimensions of the cable 166 and locations to connect the cable 166 in order to connect the cable 166 with respect to the link 150 and the circular saw 83 remove in order to have the stepped fence 126 achieve a desired position with respect to the beveling movement of the circular saw 83.

Figure 9:
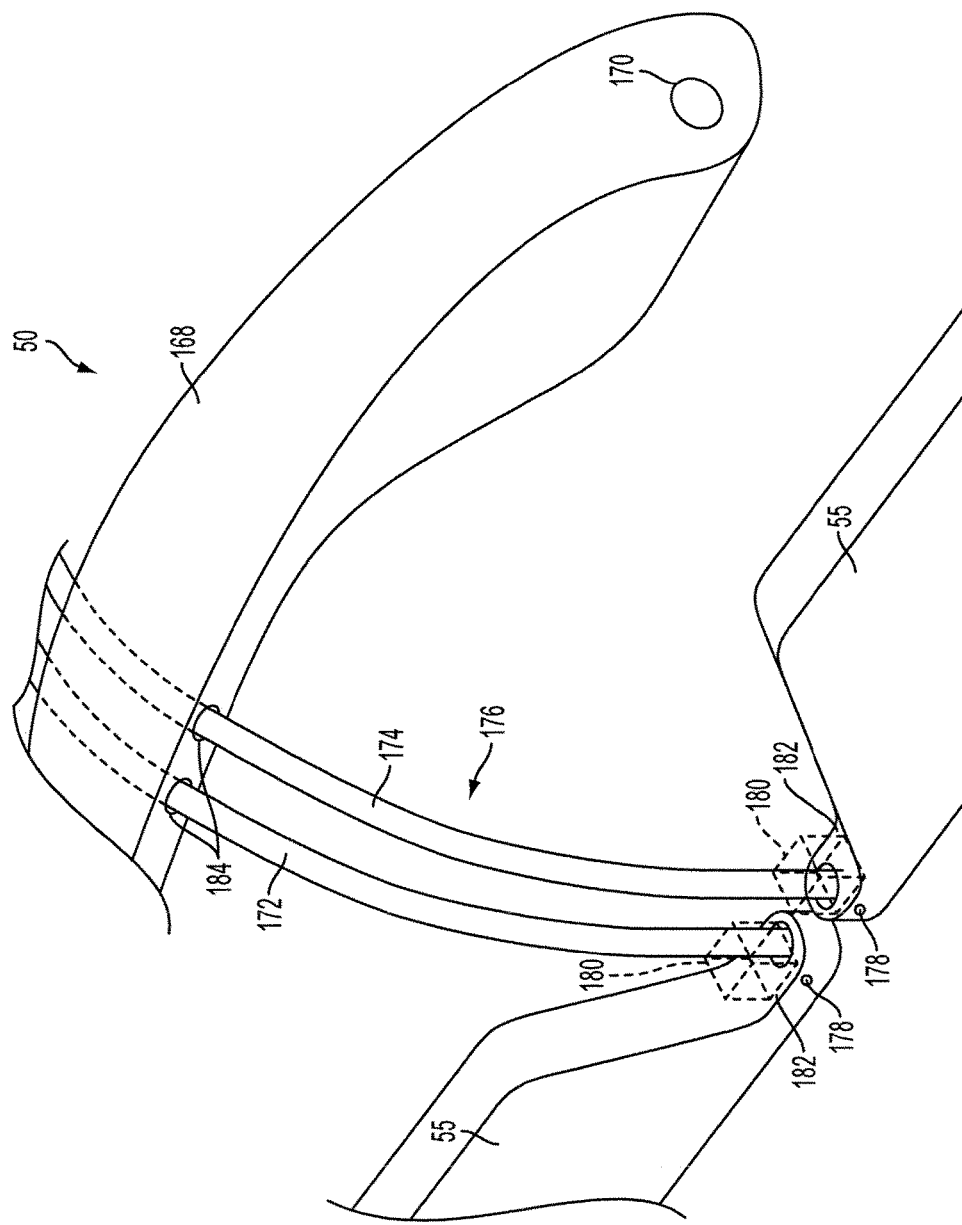
FIG. 9 is a partial perspective view of a portion of a miter saw in accordance with the invention illustrating a fence having rods to provide a surface for a workpiece to rest against near the saw blade in accordance with an embodiment of the invention.

FIG. 9 illustrates another embodiment in accordance with the invention. As shown in FIG. 9, a miter saw 50 has a neck 168. The neck 168 supports the circular saw 83 shown in FIGS. 1-3. The neck 168 may pivot about a pivot point 170. The neck 168 may be mounted to the frame 52 (see FIGS. 1-3) or some other suitable portion of the miter saw 50. The fence 55 is equipped with rods 172, 174. The rods 172, 174 have a curvature 176. The rods 172, 174 are pivotally attached to the fence 55 with pivot pins 178. The pivot pins 178 attach the rods 172, 174 to the fence 55 so that the rods 172, 174 can swing on the pivot pins 178. The pivoting of the rods 172, 174 can be useful when the circular saw 83 is adjusted at various angles for miter cuts or for bevel cuts.

In accordance with some embodiments of the invention, the rods 172, 174 are located so that the actual saw blade 128 (not shown in FIG. 9) would fit between the rods 172, 174. The rods 172, 174 may optionally be equipped with fence extension blocks 180 which can be located on a flat portion 182 of the fence 55. The fence extension blocks 180 can provide a surface to help locate a workpiece located close to the saw blade 128. The rods 172, 174 may enter into holes 184 located in the neck 168. The curvature 176 of the rods 172, 174 may correspond to the path the holes 184 travel as the neck 168 pivots about the pivot point 170. In other words, the curvature 176 of the rods 172, 174 is selected so that as the neck 168 pivots about the pivot point 170 the holes 184 are positioned along the rods 172, 174 to allow the rods 172, 174 to move smoothly through the holes 184.

Figure 10:
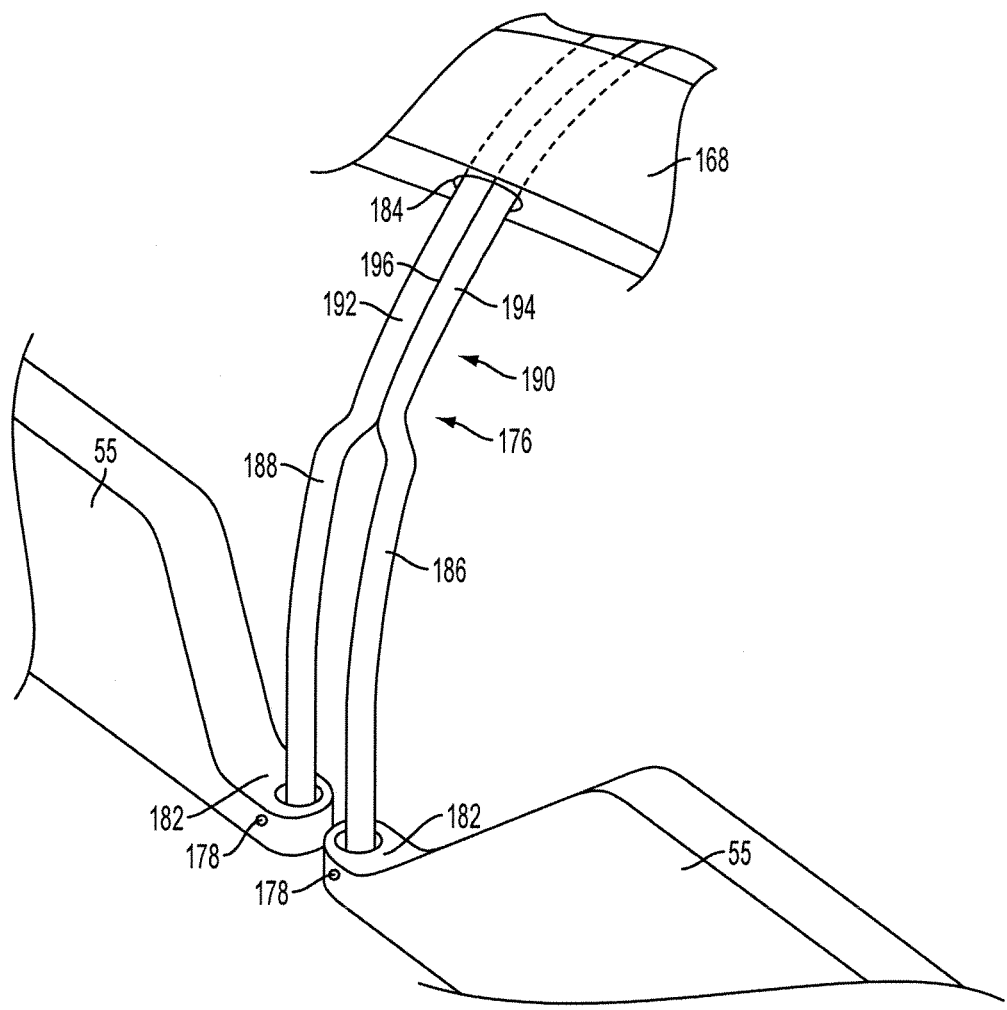
FIG. 10 is a partial perspective view of a miter saw in accordance with the invention having support rods configured to provide a surface for a workpiece to rest against near the saw blade in accordance with an embodiment of the invention.

FIG. 10 illustrates another embodiment in accordance with the invention that is similar to that shown in FIG. 9. FIG. 10 has two rods 186, 188. However, the rods 186, 188 are bent so that they form a composite portion 190 of the rods 186, 188 that fits into a single hole 184 in the neck 168. The upper parts 192, 194 of the rods 186, 188 may be flat on one side and butt against each other to form a seam 196 in the composite 190 part of the rods 186, 188. The composite portion 190 of the rods 186, 188 may have a curvature 176 that will correspond with the path traveled by the hole 184 when the neck 168 is pivoted during a cutting motion. The rods 186, 188 may be attached to the fence 55 at the flat portions 182 of the fence 55 via pivot pins 178 similar to that described above with respect to FIG. 9. Optionally the rods 186, 188 may include frame extensions 180 as shown in FIG. 9.

Figure 11:
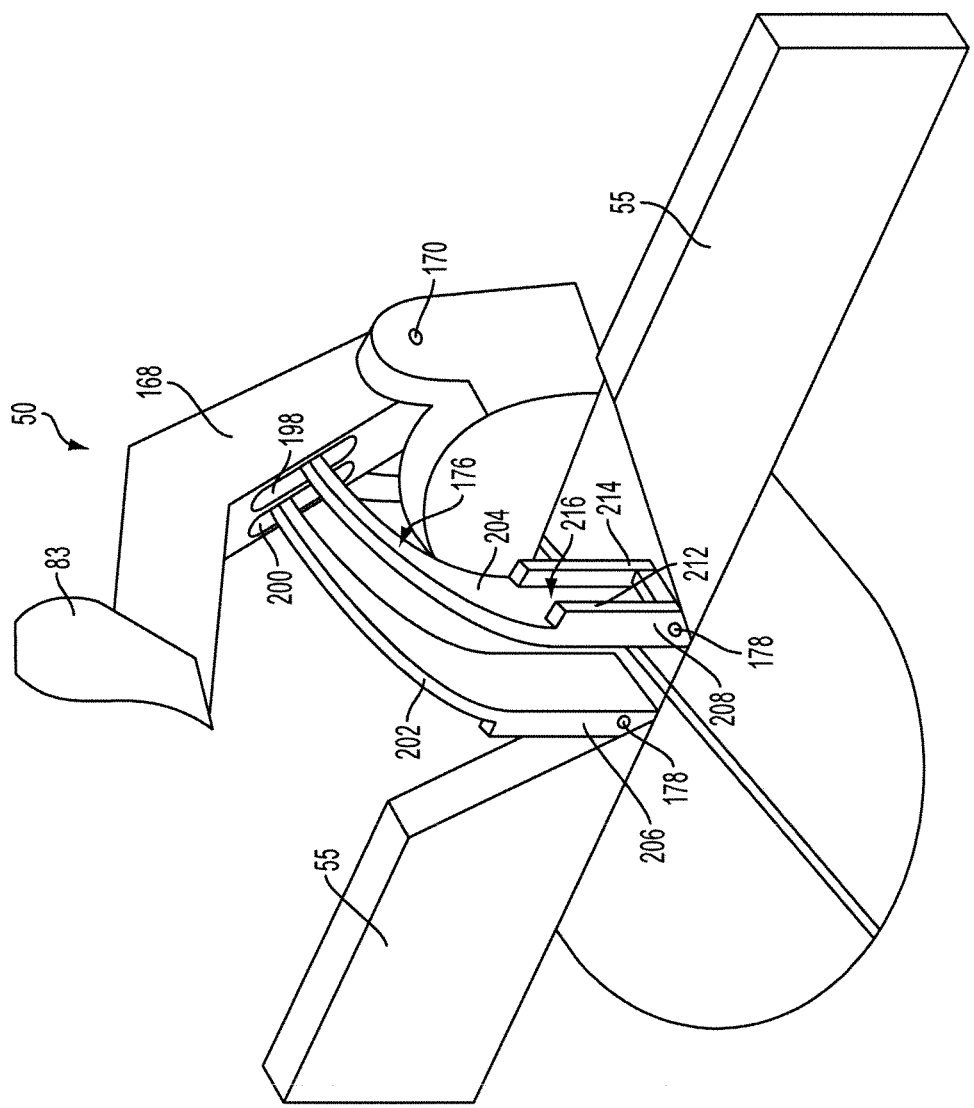
FIG. 11 is a partial perspective view of a miter saw in accordance with an embodiment of the invention having a fence equipped with adjustable bars for providing a surface for a workpiece to rest against near the saw blade in accordance with an embodiment of the invention.

FIG. 11 shows another embodiment that is similar in some ways to those shown in FIGS. 9 and 10. In FIG. 11 a partial view of the saw 50 is shown. The neck 168 has two slots 198, 200 into which curved bars 202, 204 extend. The embodiment shown in FIG. 11 uses curved bars 202, 204 rather than round rods as discussed in the earlier embodiments. The curved bars 202, 204 are attached to the fence 55 via pivot pins 178 and can pivot from side to side in accordance with adjustments made to the saw 50 for miter or bevel cuts. The curved bars 202, 204 define flat faces 206, 208 that are substantially coplanar with the front face of the fence 55 to assist in locating a workpiece near the saw blade 128. Although not shown in FIG. 11, the saw blade 128 would fit between the curved bars 202, 204.

The curved bars 202, 204 are equipped with side portions 212, 214 which define a slot 216 between them. In some embodiments in accordance with the invention, the slot 216 is dimensioned to be large enough so that the fence 55 can fit within the slot 216 should the circular saw 83 be beveled to such an angle so that the curved bars 202, 204 fit over fence the fence 55. It is also noted that in some embodiments in accordance with the invention it may be desirable for the side portions 212, 214 to be thin in order to be substantially coplanar with the fence 55 notwithstanding the fact that the side portions 212, 214 would actually fit in front or behind the fence 55 when the fence 55 is fit into the slot 216. It is noted that the curved bars 202, 204 may have a curvature 176 that corresponds roughly to the path that the slots 198, 200 travel as the neck 168 pivots upon the pivot pin 170 as the circular saw 83 is brought down to a cutting position.

Figure 12:
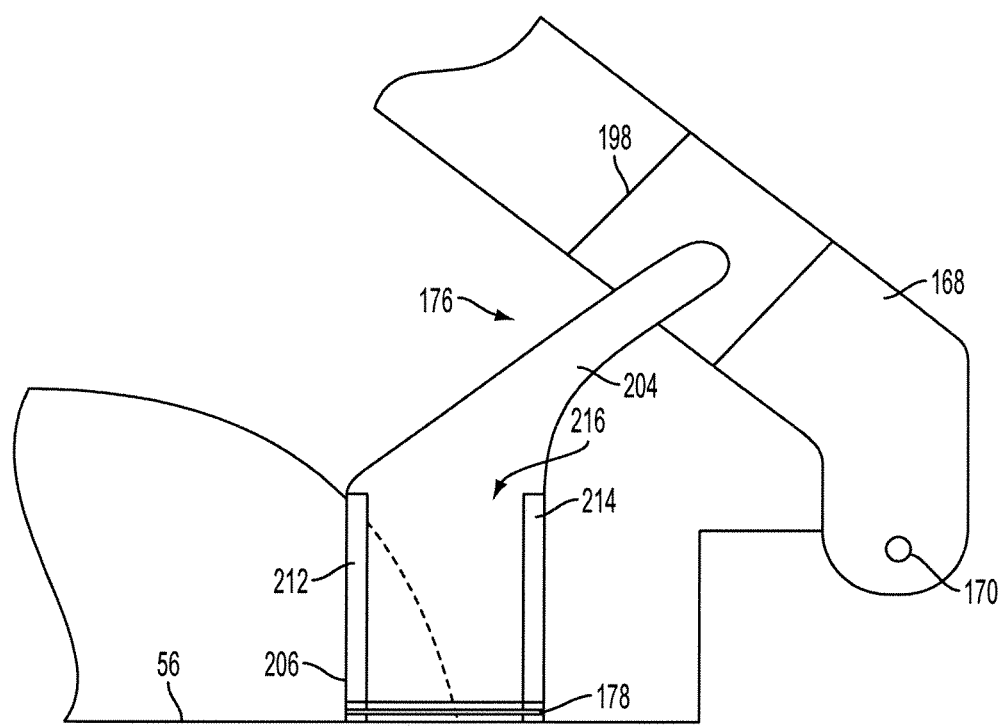
FIG. 12 is an partial side view of saw in accordance with the invention where flat bars are used rather than round rods to provide a surface for a workpiece to rest against near the saw blade.

FIG. 12 illustrates a cut-away side view of the embodiment shown in FIG. 11. The saw neck 168 pivots upon the pivot pin 170. The slot 198 in the neck 168 permits the curved bar 204 to move into, within and out of the slot 198. The curvature 176 of the bar 204 is selected so that as the neck 168 of the saw pivots about the pivot pin 170 there is no interference between the curved bar 204 and the neck 168.

The slot 216 is defined by the side portions 212, 214. The curved bar 204 pivots about the pivot pin 178 which also connects it to the fence 55. (See, for example, FIG. 11.) The front flat face 206 is substantially coplanar with the fence 55. (See, for example, FIG. 11.) Although in some embodiments of the invention the front flat face 206 not exactly coplanar as it does fit in front of the fence 55 so that the fence 55 fits within the slot 216 when the circular saw 83 is beveled to such a degree that the curved bar 204 is lying against the fence 55. Curved bar 204 generally sits on top of the table 56 and provides additional positioning assistance for a workpiece that is resting on the table 56.

Figure 13:
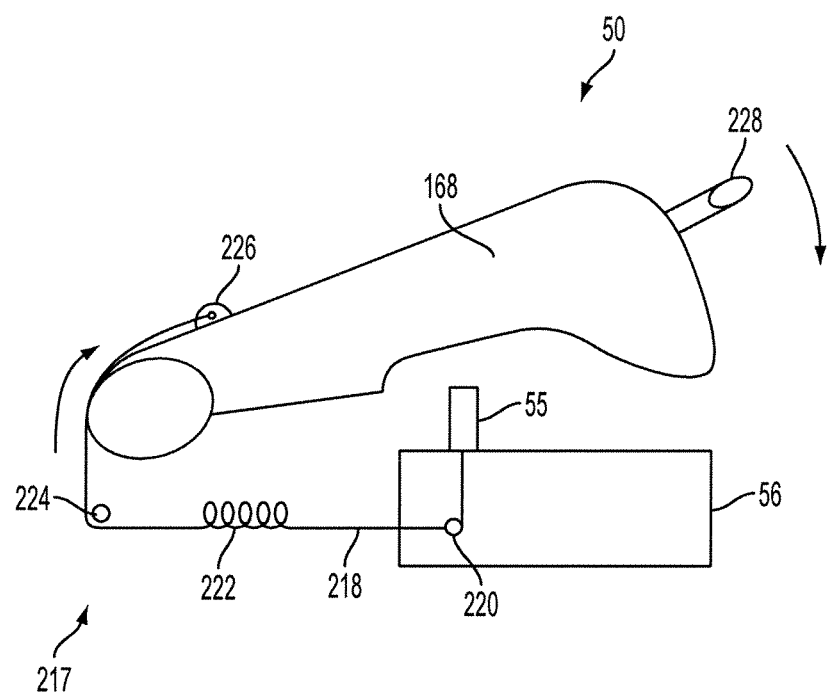
FIG. 13 is a schematic diagram of a miter saw in accordance with another embodiment of the invention where a cable system actuates the fence.

FIG. 13 illustrates another embodiment in accordance with the invention. FIG. 13 is a schematic diagram illustrating a miter saw 50 that has a cable system 217 for locking the fence 55. The cable system 217 includes a control cable 218 which is operatively connected to the fence 55. The cable 218 goes around a turning point 220 and includes a spring 222, goes around another turning point 224, and is connected to a lug 226 on the saw neck 168. The saw neck 168 is equipped with a handle 228. When the handle 228 is brought downward towards the table 56, the cable 218 pulls down on the fence 55 to lock it in place in one location. The spring 222 permits the saw arm 168 to travel a greater distance than the cable system 218 would normally permit. Thus, with the arm 168 in the up position, the user may easily adjust the position of the fence 55. When the user lowers the arm 168 to begin making the saw cut, the fence 55 is locked in place securely.

Figure 14A:
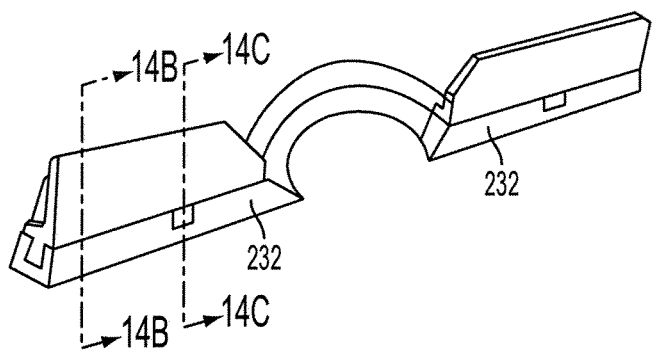
FIG. 14A is a partial perspective view of an adjustable fence in accordance with another embodiment of the invention.
Figure 14B:
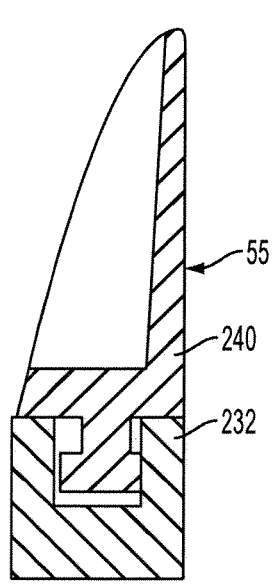
FIG. 14B is a cross-section of the fence shown in FIG. 14A taken along line 14B in FIG. 14A.
Figure 14C:
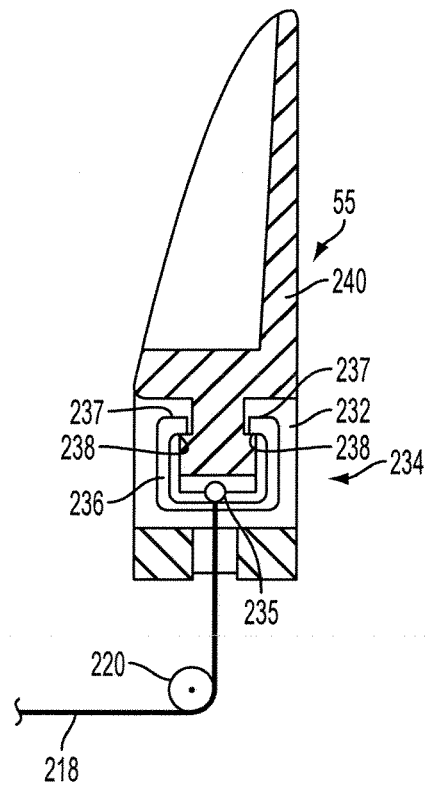
FIG. 14C is a cross-section of the fence shown in FIG. 14A taken along the line 14C in FIG. 14A.

As shown in FIG. 14A, the miter saw fence 55 is shown with two section cuts. FIG. 14B shows the cross section of the sliding fence 55 mounted in the base fence 232. The cross section taken along line 14C in 14A and shown in FIG. 14C shows a section through the locking mechanism 234. Cable 218 is routed around turning point 220 and up into the base fence 232. Turning point 220 can be a pully. Cable 220 is terminated in the bottom 235 of a clip 236. The clip 236 has features 237 such as a lip 237, for example, that engage a bottom ledge 238 of the sliding fence 240. When the miter saw arm 168 is pushed down and cable 220 is pulled tight, the clip 236, in turn, pulls on the moving fence 240. The moving fence 240 is pulled into the base fence 232 which generates a friction force sufficient to resist movement of the moving fence 240.

Figure 15:
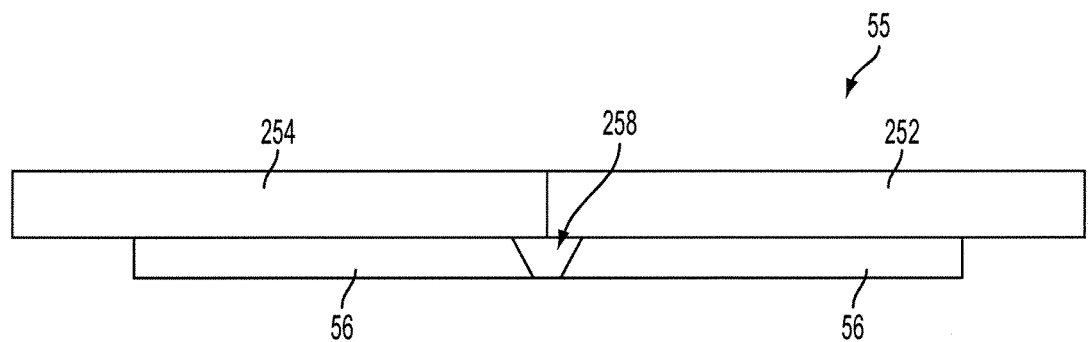
FIG. 15 is a front view of a fence that actually is contacted by the saw blade in accordance with an embodiment of the invention.
Figure 16:
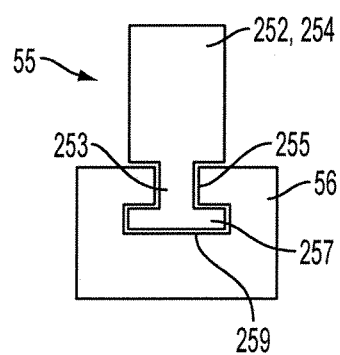
FIG. 16 is a side view of a fence that contacts the saw blade according to an embodiment of the invention.

FIGS. 15 and 16 illustrate another embodiment in accordance with the invention. The fence 55 shown in FIG. 15 is a sacrificial fence 55 made of a relatively inexpensive lightweight material such as wood or plastic that can be cut and trimmed by the saw blade 128 itself as needed to maintain a close proximity to the blade 128. This embodiment works similar to that of a zero-tolerance throat plate currently used on some table saws. The sacrificial sections of fence 252, 254 are mounted to the table 56. The sections 252, 254 of fence 55 may be mounted to the table 56 similar to the tongue and groove connection described below with respect to FIG. 16. The gap 258 within a table 56 allows the saw blade 128 to plunge through the table 56 without contacting the table 56. The sacrificial sections 252, 254 of fence 55 are slidably located on the table 56 and can be moved and locked by the user to a desired position in order to provide assistance in locating a workpiece at or near the saw blade 128.

FIG. 16 illustrates one example of how the sacrificial portions 252, 254 of the fence 55 can be mounted to the table 56. The sacrificial portions 252, 254 of the fence 55 can have a tongue 253 which fits into a groove 255 in the table 56. The tongue 253 can include a wide portion 257 that fits within a wide portion 259 of the groove 255. The wide portion 257 of the tongue 253 will permit the sacrificial sections 252, 254 of the fence 55 to slide, but not lift out of the groove 255. The sacrificial portions 252, 254 can be trimmed by the user or saw blade 128 as the saw blade 128 is moved down to make a miter or beveled cut. The sacrificial portions 252, 254 can be cut whether the saw blade 128 is mitered, beveled, or both. Such a fence 55 will provide location assistance for a workpiece very close to the saw blade's 128 location.

Figure 18:
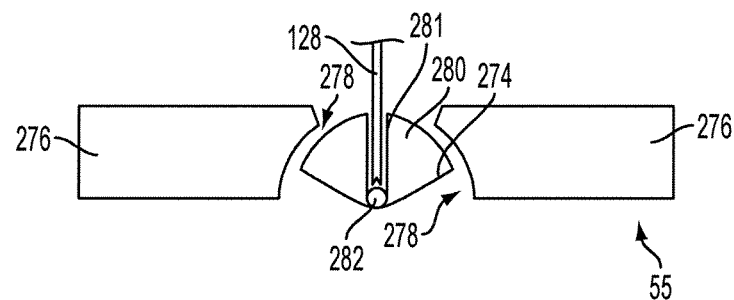
FIG. 18 is a partial front view of a fence in accordance with an embodiment of the invention.

FIG. 18 illustrates another embodiment in accordance with the invention. In the embodiment shown in FIG. 18, the fence 55 includes several portions 276, 280. A center rotating portion 280 is located between the two side portions 276 of the fence 55. The center rotating portion 280 includes a blade slot 281 to permit the blade 128 to fit within the blade slot 281.

The rotating center fence portion 280 is mounted to and rotates on a pivot pin 282 which connects the rotating fence portion 280 to a frame 52 of miter saw 50. The center rotating portion 280 has a bottom edge 274 that may nearly be horizontal or vertical when the saw blade 128 is at extreme bevel angles depending upon which way the saw blade 128 is beveled.

The rotating center fence portion 280 is operatively connected through any suitable constant velocity joint to the bevel mechanism of the circular saw 83 so that when the circular saw 83 is beveled, the center fence portion 280 will be beveled along with the circular saw 83. Therefore, the saw blade slot 281 will be aligned with the saw blade 128 when the saw blade 128 is lowered into the saw blade slot 281 during a cutting operation.

In some embodiments of the invention, the rotating portion 280 of the fence is attached to the fence 55 and the saw bevel axis extends through to the rotating part 63 of the table 56. Therefore, in some embodiments, the angle between the rotating portion 280 of the fence and the saw bevel axis changes as the saw 83 is mitered. Thus, some means of transmitting the bevel rotation through an angle is provided.

The transmitting of the bevel rotation may be achieved by use of a flexible cable, or a CV joint like that used in a FWD car axle to connect the rotating portion 280 to the bevel mechanism of the circular saw 83.

Figure 17:
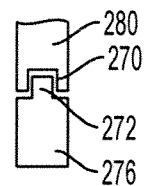
FIG. 17 is a side view of a fence resting on a fence supporting portion.

The fence portions 276 may be contoured to define a narrow gap 278 between the fence portions 276 and the rotating fence portion 280 in order to provide a minimal interruption of a surface defined by the rotating fence portion 280 and the fence portions 276. The surface of the rotating fence portion 280 and fence portions 276 may help to locate a workpiece to be cut by the saw 83. FIG. 17 shows an example of how the rotating portion 280 may engage the side portions 276. A tongue 272 is located on the rotating portion 280 which fits within a groove 270 located in the fence side portion 276.

Figure 19:
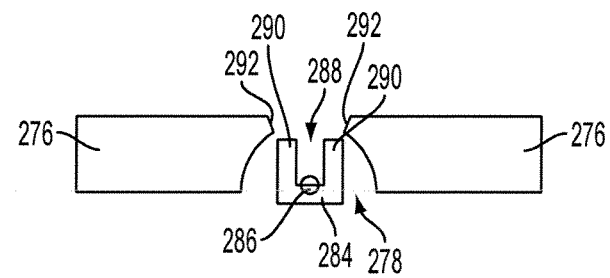
FIG. 19 is a partial front view of a fence in accordance with an embodiment of the invention.

In an alternate embodiment shown in FIG. 19, the center fence portion 284 is U-shaped and it also defines a blade slot 288 with tines 290 located on either side of the slot 288. The U-shaped center fence portion 284 is mounted to a pivot pin 286 which allows the U-shaped center fence 284 to rotate on the pivot pin 286 similar to the rotating fence portion 280 rotating on the pivot pin 282 to as described above with respect to FIG. 18. The pivot pin 286 may connect the U-shaped center fence portion 284 to the saw neck 168 of the circular saw 83. Alternatively the pivot pin 286 could be attached to some other part of the saw 50 that also bevels. The pivot pin 286 is mounted so that the pivot pin's 286 longitudinal axis is the same as the axis upon which the circular saw 83 bevels.

In some embodiments the U-shaped center fence portion 284 is operatively connected to any beveling part of the miter saw 50 so that as the circular saw 83 bevels, the U-shaped fence portion 284 will rotate with the circular saw 83 so that the blade slot 288 will be aligned with the saw blade 128 (saw blade 128 shown in FIG. 18) when the saw blade 128 is beveled.

The fence portions 276 may be contoured to allow a gap 278 between the fence portions 276 and the U-shaped center portion 284. A gap 278 permits the U-shaped center portion 284 to rotate freely about or along with the pivot pin 286 without interfering with the fence portions 276. In some embodiments of the invention, the fence portions 276 may also have chamfered edges 292 in order to not interfere with the saw blade 128 at extreme bevel angles.

Figure 20:
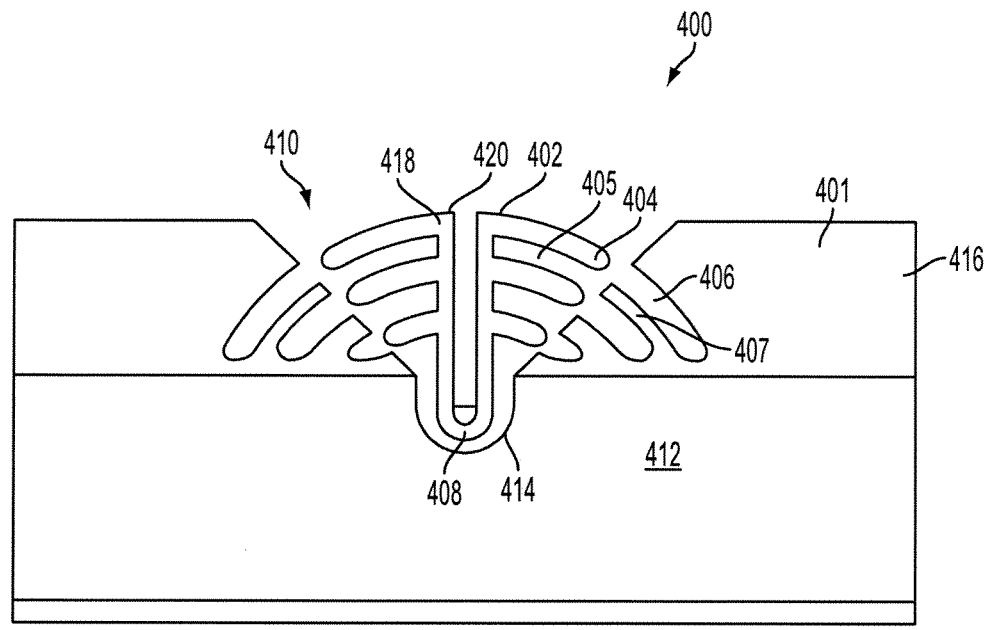
FIG. 20 is a partial front view of a fence and table assembly in accordance with an embodiment of the invention where the fence has a pivoting portion that pivots with the bevel angle of the saw.

FIG. 20 illustrates another embodiment in accordance with the invention where a fence 400 includes a pivoting portion 402. The pivoting portion 402 includes alternating fingers 404 and slots 405. The fingers 404 fit within slots 406 located in the fence portion 416. Fingers 407 on the fence portion 416 fit within the slots 405 within the center rotating portion 402. The center rotating portion 402 may be pivotally mounted to the frame 52 of the miter saw 50 by a pivot pin 408. The rotating portion 402 may alternatively be attached to the saw neck 168 similarly to as described with respect to the center frame sections 280, 284 described above with respect to FIGS. 18 and 19.

In some embodiments of the invention, the fence portion 416 combines with the center section 402 to form a somewhat coplanar surface incorporating the front surface 418 of the center portion 402 and the fence portion 416. The center fence section 402 may be operatively connected to any beveling part of the miter saw 50 so that as the circular saw 83 bevels, the center rotating portion 402 rotates with the circular saw 83 as the circular saw 83 bevels similar to as described with respect to FIGS. 18 and 19. In this manner, that the saw blade 128 (see, for example, FIG. 18) fits within the blade slot 420 at all bevel angles. The table portion 412 has a relief cutout 414 in order to permit the center fence section 402 to rotate without interfering with the table 412.

Figure 21:
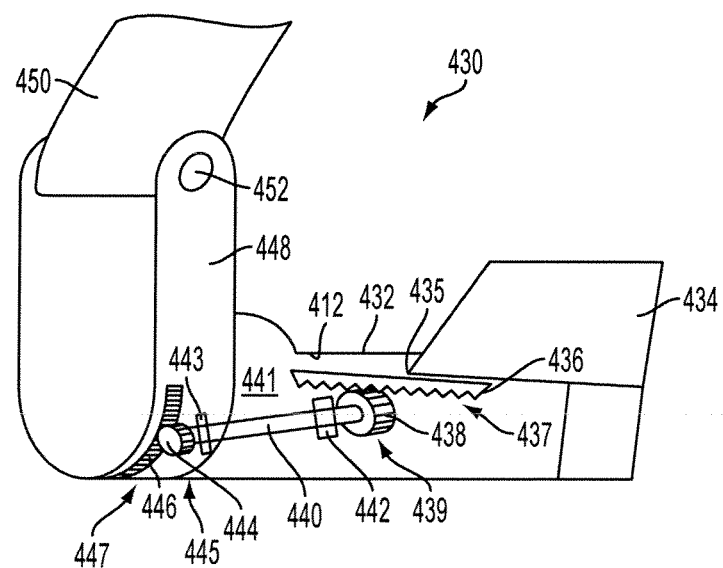
FIG. 21 is a partial perspective view of an embodiment in accordance with the invention where the fence moves as the saw is beveled.

FIG. 21 illustrates another embodiment of the invention. In FIG. 21 the saw assembly 430 includes a table 432. Located on the table 432 is a fence portion 434. A rack 436 is mounted to the underside of the fence portion 434. There may be a slot 435 in the table 432 that the fence portion 434 extends through to connect to the rack 436. The fence portion 434 may move along the slot 435. In some embodiments the slot 435 may define the distance the fence portion 434 can move on the table 432. In other embodiments of the invention, the fence portion 434 may connect to rack 436 in other suitable ways.

The rack 436 is equipped with teeth 437 which interact and communicate with corresponding teeth 439 located on a pinion 438. The pinion 438 is mounted onto a shaft 440. The shaft 440 attaches to the frame 441 of the saw assembly 430 with a bracket 442. A second bracket 443 also attaches the shaft 440 to the arm mount 448.

The arm mount 448 is equipped with a rack 446 having teeth 447. The rack 446 may be contoured to correspond with the surface of the arm mount 448. The teeth 447 on the rack 446 communicate with teeth 445 located on the pinion 440 which is mounted to the shaft 440. Therefore, as the arm mount 448 rotates, it causes the fence 434 to move.

Engineering design selections for the dimensions of the teeth, pinion, and racks can determine the distance the fence 434 moves when the arm mount 448 is beveled to achieve a desired result. The arm mount 448 provides a mount for the arm 450. The arm 450 is mounted via a pivot pin 452 to the arm mount 448 in a manner to permit the circular saw 83 (not shown in FIG. 21, but shown in other FIGS.) which is connected to the arm 450 to move up and down in order to make cuts and retreat after a cut is made. The saw assembly 430 shown in FIG. 21 can be adapted to miter saws 50 having a standard beveling and mitering system including a locking system. The locking system to lock the arm 450 and arm mount 448 in place with respect to a miter or bevel axis. When the arm mount 448 is locked in place, then the fence 434 is also locked in place and cannot move due to its mechanical connection to the arm mount 448.

In some embodiments of the invention, a corresponding shaft, pinion and rack system may be located on the opposite side of the arm mount 448 for actuating a second fence portion 434. The second rack, pinion, and shaft systems may be oriented in a reverse image of that shown in FIG. 21 in order to operate the second fence portion 434. If the fence portion 434 were considered a left hand fence portion from the perspective of a user, then the second fence portion may be considered a right hand fence portion. One skilled in the art after reviewing this disclosure would understand how to orient a second rack pinion and shaft system in order to operate the second fence portion in a similar manner to that fence portion 434 as shown.

Figure 22:
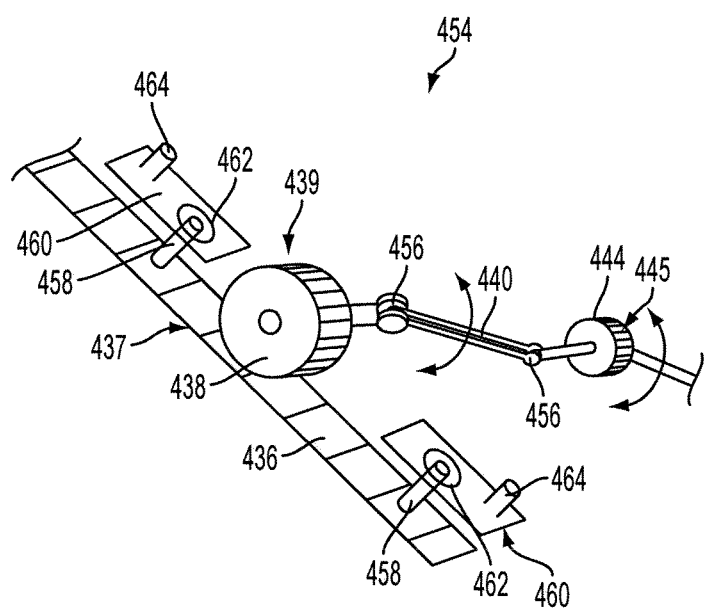
FIG. 22 is a partial perspective view in accordance with an embodiment of the invention where a fence moves as the saw is beveled in accordance with an embodiment of the invention.

FIG. 22 illustrates another embodiment in accordance with the invention that is similar to that shown in FIG. 21 but differs in several ways. As shown in FIG. 22, the shaft 440 can be comprised of several shafts connected by U-joints 456. The U-joints 456 permit the shaft 440 to transmit power in not necessarily a straight line. The pinion 444 is connected to one end of the shaft 440. The pinion 444 is equipped with teeth 445. The pinion 444 interacts with a rack 446 and arm mount 448 as shown and described with respect to FIG. 21.

The opposite end of the shaft 440 has a pinion 438 equipped with teeth 439. The teeth 439 interact with the teeth 437 on the rack 436. The rack 436 attaches to the fence 434 (see FIG. 21) via rack pins 458. The rack pins 458 extend upward into slots 462 located in a sled 460.

The slots 462 may be generally oval in shape and are dimensioned to allow the pins 458, and therefore the rack 436, to move a limited distance without causing the sled 460 to move. The sled 460 may also include pins 464 which provide a means for connecting to a fence portion 434 similar to the fence 434 shown in FIG. 21. According to some embodiments of the invention, the pins 464 extend into holes in the fence 434 and thereby connect the fence 434 to the sled 460. In other embodiments of the invention, the slot 462 may be located directly in the fence portion 434 without the use of an intermediate sled 460 as shown in FIG. 22.

The pins 458 and the slots 462 are dimensioned and located so that when the arm 450 or arm mount 448 are beveled, for example, to the right, then the fence portion 434 located to the right will be moved out of the way of the blade 128. To continue the example, during the movement of the arm 450, arm mount 448, and the fence portion 434 on the right being moved to the right, the left hand fence portion 434 may not necessarily be moved depending on the selected dimensions of the slot 462 and how far the arm 450 is beveled. It is contemplated that the fence portion 434 located on the same side of the miter saw 50 as the arm 450, arm mount 458, being rotated during a beveling operation will move out of the way. However, the opposite fence portion 434 may, may not move, or move a limited distance (compared to the movement of the fence portion 434 located on the same side of the miter saw 50 as the circular saw 83 is being beveled) toward the saw blade 128 depending how far the circular saw 83 is being beveled.

Optionally, a user can manually move the fence portion 434 within the geometry of the slot 462 and the pin 458. However, it is contemplated that in most embodiments of the invention, the pins 458 and slots 462 will be located and dimensioned so that whichever direction the arm 450 or arm mount 448 is moved, that side's fence portion 434 will move out of the way of the blade 128.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A miter saw comprising:
a table for supporting a workpiece;
a first fence located on the table; and
a beveling arm rotatable connected to the table for supporting a saw blade and allowing the saw blade to be inclined relative to the table, and
a non-electric means for automatically moving the first fence when the beveling arm is rotated to incline the saw blade;
wherein, after the first fence is moved, the saw blade does not contact the first fence when the saw blade is moved toward the table to a cutting position.

2. The miter saw of claim 1, wherein the first fence is comprised of first and second portions, wherein the first portion is movable relative to the second portion.

3. The miter saw of claim 2, wherein the non-electric means comprises a link pivotably attached to, the first and second portions.

4. The miter saw of claim 3, wherein the non-electric means further comprises a cable connecting the link to the beveling arm.

5. The miter saw of claim 2, wherein the non-electric means further comprises a member attached to the first portion and connected to the beveling arm.

6. The miter saw of claim 5, wherein the member is at least one of a rod and a bar.

7. The miter saw of claim 2, wherein the non-electric means comprises a shaft rotatably disposed on at least one of the beveling arm and the table, wherein the shaft rotates when the beveling arm is rotated relative to the table, the shaft's rotation causing movement of the first portion.

8. The miter saw of claim 7, wherein the first portion has a rack, and the shaft has a pinion meshingly engaging the rack.

9. The miter saw of claim 1, further comprising a second fence located on the table; wherein the second fence is operatively connected to the beveling arm to move the second fence when the blade is beveled so that the blade does not contact the second fence when the blade is moved toward the table.

10. The miter saw of claim 9, wherein the second fence is comprised of first and second portions, wherein the first portion is movable relative to the second portion.

11. The miter saw of claim 10, wherein the first fence has a slot for receiving the blade when the blade is moved toward the table.

12. The miter saw of claim 11, wherein the first fence has at least one finger, and the second fence has at least one slot for receiving the finger.

13. The miter saw of claim 1, wherein the non-electric means comprises a cable connecting to the beveling arm and to the first portion.

14. The miter saw of claim 13, wherein the cable locks a position of the first portion relative to the second portion when the blade is moved toward the table.

* * * * *